(12) United States Patent
McKinney

(10) Patent No.: US 6,644,015 B2
(45) Date of Patent: Nov. 11, 2003

(54) TURBOJET WITH PRECOMPRESSOR INJECTED OXIDIZER

(75) Inventor: Bevin C. McKinney, Gig Harbor, WA (US)

(73) Assignee: HMX, Inc., Reno, NV (US)

( * ) Notice: Subject to any disclaimer, the term of this patent is extended or adjusted under 35 U.S.C. 154(b) by 1 day.

(21) Appl. No.: 10/029,760

(22) Filed: Oct. 29, 2001

(65) Prior Publication Data
US 2003/0079463 A1 May 1, 2003

(51) Int. Cl.$^7$ ............................................. F02K 11/00
(52) U.S. Cl. ..................... 60/205; 60/269; 60/767; 60/39.23
(58) Field of Search .......................... 60/204, 205, 257, 60/269, 767, 794, 39.23, 39.461

(56) References Cited

U.S. PATENT DOCUMENTS

| | | | |
|---|---|---|---|
| 2,673,445 A | | 3/1954 | Bruckmann |
| 3,110,153 A | | 11/1963 | House |
| 3,229,459 A | * | 1/1966 | Cervenka ..................... 60/244 |
| 3,237,400 A | * | 3/1966 | Kuhrt ........................... 60/246 |
| 3,261,571 A | * | 7/1966 | Pinnes ......................... 244/162 |
| 3,557,557 A | * | 1/1971 | Pracher ........................ 60/257 |
| 3,756,024 A | | 9/1973 | Gay |
| 4,342,193 A | | 8/1982 | Thatcher |
| 5,025,623 A | | 6/1991 | Hirakoso et al. |
| 5,101,622 A | | 4/1992 | Bond |
| 5,572,864 A | | 11/1996 | Jones |
| 5,572,865 A | | 11/1996 | Sackheim et al. |
| 5,775,096 A | | 7/1998 | Plichta |
| 6,012,279 A | | 1/2000 | Hines |
| 6,148,609 A | | 11/2000 | Provitola |
| 6,202,404 B1 | | 3/2001 | Balepin |
| 6,250,064 B1 | | 6/2001 | Tomlinson et al. |

OTHER PUBLICATIONS

AIAA 96–3036 Deep–Cooled Turbojet Augmented with Oxygen—Cryojet for an SSTO Launch Vehicle, V.V. Balepin, M. Maita, N. Tanatsugu and S.N.B. Murthy, $32^{nd}$ AIAA/ASME/SAE/ASEE Joint Propulsion Conference.

* cited by examiner

Primary Examiner—Ehud Gartenberg
(74) Attorney, Agent, or Firm—Stiennon & Stiennon

(57) ABSTRACT

A turbojet engine with improved thrust and high-altitude capabilities. Arrangements are provided for injecting liquid oxygen or other oxidizer into the turbojet engine before the compressor section. Cooling the incoming air by the liquid oxygen reduces the air volume, which allows a fixed inlet to be matched to varying flow conditions, allowing a greater mass of air to be ingested by the compressor section and results in a lower compressor outlet temperature. Increased mass flow, combined with more fuel results in higher exhaust gas temperatures and greater thrust. The addition of oxygen to the inlet air flow allows the engine to operate at higher altitudes by preventing flameout due to rarefied air.

5 Claims, 1 Drawing Sheet

TURBOJET WITH PRECOMPRESSOR INJECTED OXIDIZER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to high-speed aircraft and space launch vehicle propulsion, specifically to a method of improving the performance and thrust level of turbojet engines when used in such vehicles and enabling turbojet engines to operate effectively at higher speeds and higher altitudes.

There are a number of valuable missions that can be performed by aircraft capable of operating both inside and outside the atmosphere. Such aircraft are often referred to as trans-atmospheric vehicles. They generally accelerate through the atmosphere using air-breathing engines, and, after reaching the limits of atmospheric flight, continue to accelerate outside the atmosphere using rocket engines till their final velocity is achieved.

Missions for such aircraft include high-speed long-range transports, military strike and reconnaissance aircraft, as well as orbital space transports. These extreme missions place severe demands on propulsion systems. They must deliver very high performance to efficiently achieve high velocities. They must also function from very low velocity during takeoff at sea level, to orbital velocities beyond the atmosphere.

Trans-atmospheric vehicles generally use a combination of air-breathing and rocket propulsion. air-breathing systems are valuable since they gather a significant fraction of their propellant from the atmosphere. This reduces the amount of propellant that must be stored onboard and increases overall vehicle efficiency. Consequently, air-breathing propulsion is often used to the greatest extent possible before exiting the atmosphere and accelerating to final velocity under rocket power.

Turbojet engines are attractive for such applications due to their high effective efficiency, as well as their operational flexibility. They are particularly valuable during takeoff and landing where their high efficiency at low speeds is critical. However, conventional turbojets are limited in their ability to operate at the high speeds and altitudes associated with trans-atmospheric flight. To extend the velocity and altitude that can be reached using air-breathing engines, a series of combined cycle approaches have been suggested. These cycles combine the positive attributes of turbojet engines with other air-breathing cycles, including ramjets and scramjets. Unfortunately, these combined cycle approaches are relatively heavy and complex.

These previous air-breathing concepts have been characterized by relatively low thrust-to-weight ratios. This is acceptable for missions where propellant economy during long periods of atmospheric cruise is important. However, trans-atmospheric and space launch missions are generally dominated by acceleration requirements where high thrust is often more advantageous than specific impulse. This is due to the increase in gravity and drag losses during extended acceleration periods. Consequently, an increase in engine thrust, even at relatively low specific impulse, can result in decreased overall propellant consumption since acceleration time decreases out of proportion to the increase in propellant flow.

To address the problem of low engine thrust-to-weight, several concepts have been proposed which utilize pre-cooling to densify inlet air. This increases the engine's power density and allows it to operate at higher Mach numbers. These engines generally use liquefied hydrogen for fuel. Before entering the engine, the cold hydrogen is circulated through heat exchangers ahead of the turbojet inlet to cool the incoming air. This effectively cools the air, but also produces undesirable drag reducing overall efficiency. The heat exchanger is inherently heavy, and often accounts for more than 35% of the overall engine weight. It is also difficult to operate the heat exchange at low altitude because of the problem of ice formation in the heat exchanger.

What is needed is an air breathing engine which can provide increased thrust and operates over a wider flight envelope of Mach number and altitude.

SUMMARY OF THE INVENTION

The engine of this invention is a turbojet which allows improved thrust, reduced drag, higher operating velocities, and higher maximum altitude of operation. The engine has a duct with an inlet for admitting atmospheric air. Arrayed sequentially in the duct are an air inlet, liquid oxidizer injection nozzles, a compressor section for compressing the atmospheric air, a combustor section for heating the atmospheric air by combustion of fuel, a turbine for extracting power from the heated air, an afterburner chamber where additional fuel can be burnt with the exhaust of the turbine, a nozzle, and finally an expansion bell.

The engine can function as a normal jet engine, taking in atmospheric air, compressing the air in the compressor section, heating the air by the combustion of fuel, extracting power to operate the compressor section, with a turbine, allowing the turbine exhaust with or without additional heating by the combustion of further fuel to expand through the nozzle to generate thrust.

The engine has provisions for the injection of an oxidizer, such as liquid oxygen, upstream of the compressor section to cool and increase the oxygen content of the atmospheric air ingested by the compressor section. Cooling the incoming air reduces the air volume, which allows a fixed inlet to be matched to varying flow conditions, allows a greater mass of air to be ingested by the compressor section, and allows the compressor section to compress the incoming gases to higher pressure. Cooling of the incoming air also reduces the compressor outlet temperature. The compressed air with the added oxygen is heated by combustion of fuel and expanded through the turbine to provide power to drive the compressor section. The gases entering the afterburner chamber are at higher pressure, and have a higher oxygen content, and are heated with additional fuel at a stoichiometric mixture ratio, and are then directed through a nozzle and expansion bell to produce thrust.

The injection of liquid oxygen increases mass flow by increasing the effectiveness of the compressor section, and by the addition of the mass of the liquid oxygen. Increased mass flow and higher exhaust gas temperatures, due to additional fuel and higher combustion temperatures, result in higher thrust. The injected oxygen, by allowing the amount of air ingested by the compressor section to be increased, allows a fixed inlet area to be inlet matched to the varying mass flow with increased Mach Number. The addition of oxygen to the inlet air flow allows the engine to operate at higher altitudes by preventing flameout due to decreasing oxygen.

The engine thus can operate in the manner of a normal turbojet engine, or may be thrust augmented, and operated at higher altitudes by the addition of an oxidizer to the inlet air.

It is an object of the present invention to provide a jet engine of improved thrust.

It is another object of the present invention to provide a jet engine which can accomplish inlet matching, without a variable geometry inlet.

It is yet another object of the present invention to provide a turbojet engine that can operate at increased velocity before exceeding compressor temperature limits.

It is also an object of the present invention to provide a turbojet engine that can pre-cool its inlet air without the use of a heat exchanger.

It is an additional object of the present invention to provide a turbojet engine that can pre-cool its inlet air without the use of liquid hydrogen, allowing higher density hydrocarbon fuels to be used.

Further objects, features and advantages of the invention will be apparent from the following detailed description when taken in conjunction with the accompanying drawings.

DESCRIPTION OF THE PREFERRED EMBODIMENTS

Figure 1:
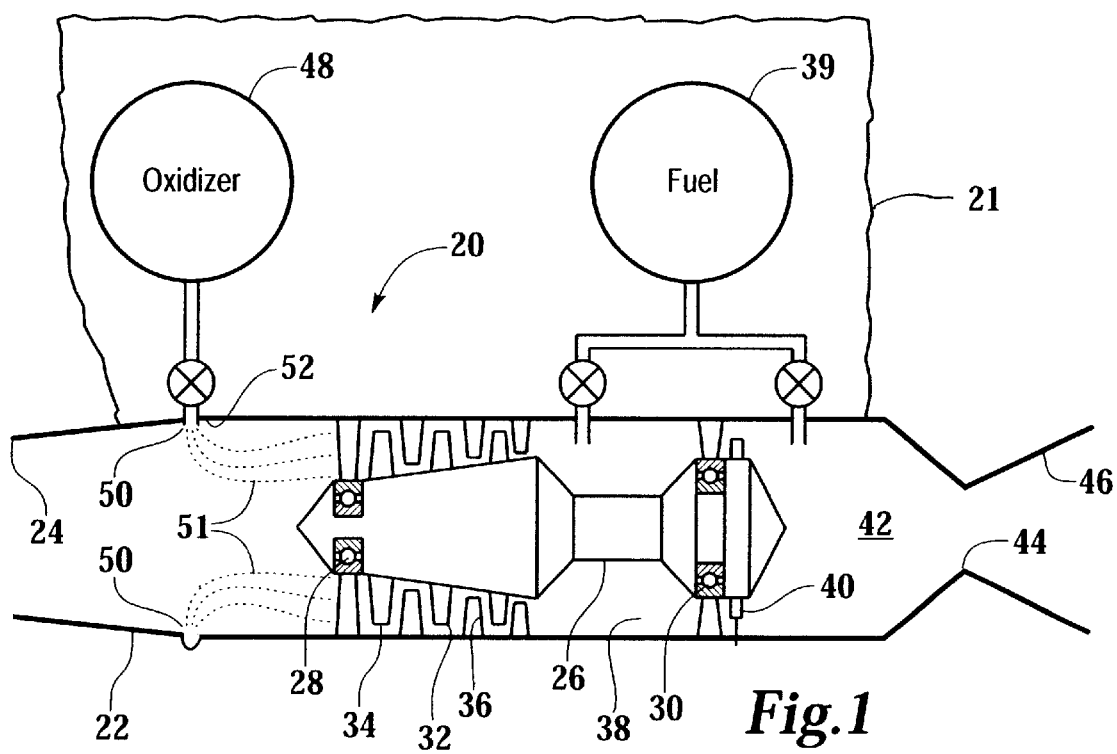
FIG. 1 is a side elevational, cross-sectional, schematic view of the engine of this invention
Figure 2:
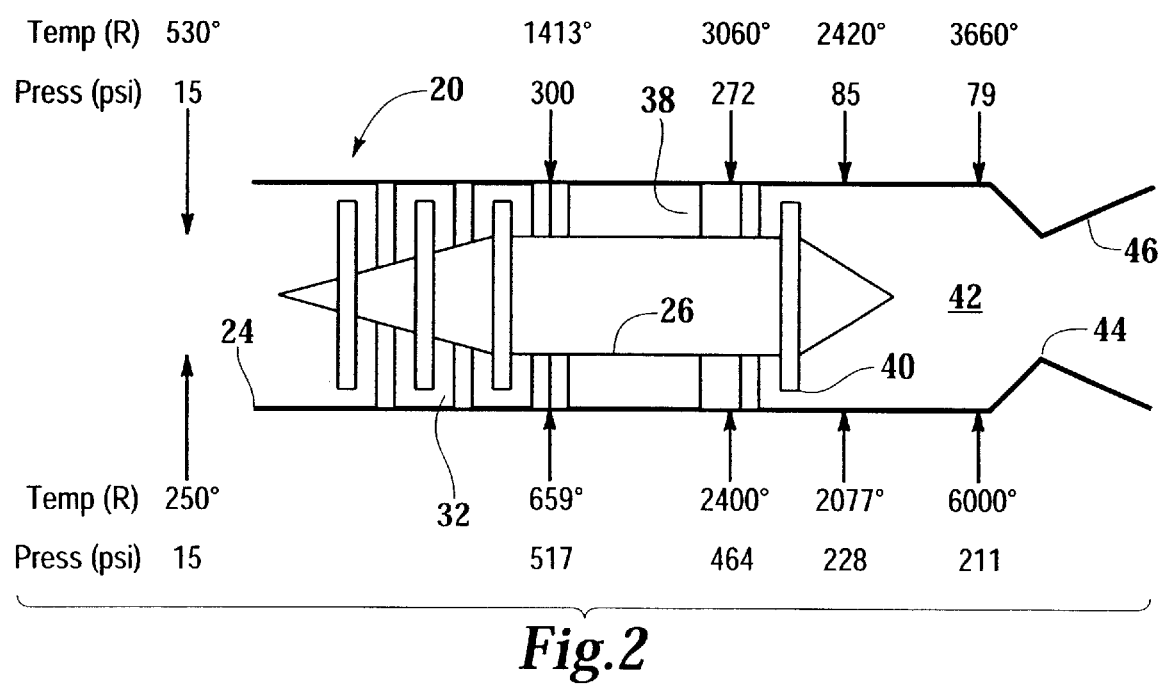
FIG. 2 is a schematic and process flow comparison between the engine of FIG. 1 operating as a conventional turbojet, and operating with significant liquid oxygen injection before the compressor section.

Referring more particularly to FIGS. 1 and 2, wherein like numbers refer to similar parts, a turbojet engine 20 is shown in FIG. 1. The engine 20 has a duct or outer shell 22 which is mounted to a vehicle 21. Typically the duct 22 will be mounted externally to the vehicle wings, or internally to the wings or the body of the vehicle. The duct 22 has an inlet 24 which faces in the direction of travel of the vehicle so that air flows into the duct at a velocity substantially equivalent to the vehicle velocity through the atmosphere. A shaft 26 is mounted for rotation by forward bearings 28 and rearward bearings 30. A compressor section 32 is formed with rotor blades 34 mounted to the shaft 26 and stator blades 36 mounted to the duct. The compressor section 32 is adjacent to and in air receiving relation to the engine inlet 24. Downstream of the compressor section 32 is a combustor section 38 where fuel from a fuel tank 39 is supplied to be burnt with the compressed air from the compressor section. The combustion gases are expanded through a turbine 40 which is on the same shaft 26 on which the compressor blades 28 are located. The turbine 40 provides the power to drive the compressor section 32. An afterburner chamber 42 is positioned downstream of the turbine 40 and additional fuel is burnt with the exhaust of the turbine, the resulting gases are expanded through a nozzle throat 44 and an expansion bell 46, which also constitutes the outlet of the duct 22.

As described above, the components of the engine 20 are similar or identical to those used to construct a conventional turbojet engine; however, the engine 20 as shown in FIG. 1 is combined with an oxidizer tank 48 which supplies liquid oxygen to an oxidizer injector 50, upstream of the compressor section 22 between the inlet 24 and the compressor section 22. The oxidizer injectors are arrayed circumferentially about the duct 22 to uniformly distribute the liquid oxygen 51 into the air which is entering the compressor section 32 with minimal velocity reduction to the incoming air. Thus the oxidizer injector 50 is mounted to inject oxidizer radially inwardly through a portion of the duct inlet inner surface 52.

The injection of other fluids particularly water, ammonia, or water mixed with alcohol, is known for the purposes of increasing the thrust of a turbojet engine. By injecting fluid such as water, water-alcohol or ammonia, evaporation of the liquid cools the air before or while it is being compressed in the compressor section of a turbojet engine or stationary turbine power engine. Water and ammonia have relatively high latent heat of evaporation, and rather high specific heats, and so are effective working fluids for the purposes of cooling the air entering a gas-turbine. For a vehicle-mounted engine some benefit can be gained from using ammonia or a water-alcohol combination because the benefits of cooling and later combusting the alcohol or ammonia as fuel is gained from the same fluid.

However, injecting water or fuel has limited capability to increase thrust, and excessively high levels of water, or ammonia, may interfere with combustion.

Injection of oxygen combined with the injection of sufficient fuel to stoichiometricly combine with the injected oxygen and the oxygen present in the air ingested by the engine, allows greatly increased thrust. The thrust for a jet engine is dependent directly on mass flow, inversely to the square root of the molecular weight of the combustion gases, and directly as the square root of combustion gases temperature. Injection of oxygen has a small negative effect on molecular weight, which may even be offset by the added fuel. On the other hand, the increase in mass flow and the increase in combustion gas temperature are substantially improved by the injection of liquid oxygen.

FIG. 2 shows a calculated comparison between a turbojet and a turbojet modified for oxygen augmentation. An amount of liquid oxygen equal to 38 percent of the weight of the air entering the inlet is added to the air before it is ingested by the compressor section, lowering the temperature of incoming air to 250 degrees° R. Although the added oxygen accounts for only 38 percent of the gases passing through the compressor, the total mass of gases is increased by a factor of about 3.7 due to the additional air which is ingested and compressed by the compressor due to increased air density at the lower temperature. The decrease in inlet temperature allows more gas to be compressed to a higher pressure with the same power requirements. Thrust is further increased by the addition of the mass of additional fuel which increases mass flow by about 7 percent, and more importantly a much higher combustion temperature which increases temperature by about 1.6 times and thrust by about 30 percent. The net result is a thrust approximately five times the unaugmented thrust of the engine 20.

The thrust augmentation shown in FIG. 2 is for sea level conditions and shows how a turbojet engine can be modified to provide a high thrust boost engine. Typically it is highly desirable to provide air breathing engines on the first stage of a launch vehicle, or on a transatmospheric vehicle. Air breathing engines, however, are relatively heavy for a given level of thrust, and typically have a thrust-to-weight ratio of between 8 and 12. If the engines are not used during the takeoff and boost phase, they are entirely deadweight until late in the flight profile, where sustained cruise is required. Space launch and transatmospheric vehicles are extremely weight critical, inasmuch as small increases in the vehicle structure can result in a large decrease in vehicle performance. A basic design conflict must often be resolved between the mission enhancing benefit of air breathing cruise capability, and a significant decrease in vehicle performance due to the added weight of air breathing engines.

Using air breathing engines to provide the thrust necessary for takeoff and acceleration through the atmosphere only makes the vehicle design more difficult. Takeoff thrust usually optimizes at more than 50 percent of takeoff weight, meaning a conventional air breathing engine with a thrust-to-weight ratio of 12 will account for at least four percent of the total weight of the vehicle (Vwt×0.5×$\frac{1}{12}$=0.042). The fraction of the total weight of vehicle which is structure will generally be less than less than 20 percent. Compounding the problem of using air breathing engines for launch is the fact that the amount of thrust needed for cruise, or loiter over target, or return to launch site, may be only about three to five percent or less of the takeoff weight. Thus the air breathing engines which provide the necessary takeoff trust have 10 to 20 times more thrust capability than is needed for cruise capability.

The liquid oxygen augmented engine 20 by having its sea level performance increased by a factor of five without substantial increase in engine weight means that the air breathing launch engines have an effective thrust-to-weight ratio of 60 and will account for less than one percent of gross vehicle weight. At the same time the thrust without oxygen augmentation is now substantially matched to cruise requirement thrust levels.

An oxygen augmented turbojet engine has at least three other advantageous attributes. As a vehicle accelerates, the total amount of air flowing into the engine inlet increases directly proportional to the increase in vehicle velocity and to change in atmospheric density. The result for high-speed flight is that the amount of air flowing into the engine exceeds the amount of air which the engine can ingest, resulting in excess air spilling out of the engine inlet. The spilling air results in a dramatic increase in vehicle aerodynamic drag. Therefore a design compromise is required between the added complexity, weight, and cost of a variable geometry engine inlet and the performance limitations of designing an inlet which exhibits optimal performance only at a relatively small range of mass flow. As we saw in examining FIG. 2, augmentation with liquid oxygen can more than double the amount of air which the compressor section can ingest. Thus liquid oxygen injection upstream of the compressor can be used to increase airflow through the compressor allowing the airflow capabilities of the compressor to be matched to the mass flow through the inlet as it varies due to increased vehicle velocity.

Another design function performed by the injection of liquid oxygen upstream of the compressor section is to pre-cool incoming air to reduce temperatures within critical portions of the engine which typically control the maximum flight velocity of a turbojet engine. Material limitations of the compressor blades or of the turbine blades dictate maximum operating temperature. With increased vehicle flight velocity through the atmosphere the temperature of the air at the vehicle inlet increases rapidly.

Liquid oxygen can extend the maximum aerodynamic flight velocity by decreasing inlet air temperature. Decreasing inlet air temperature prevents overheating of the blades of the compressor section. Excessive temperature in the compressor section typically limits the maximum flight velocity in a turbojet engine. Unlike water, the amount of liquid oxygen which can be injected is not limited by concerns about flameout due to decreased oxygen levels in the combustor sector. The added oxygen facilitates combustion, and maximum flame temperature in the combustor section can be controlled by limiting fuel, to operate the combustor section oxygen rich. Stoichiometric combustion for maximum thrust is accomplished in the afterburner where the chamber walls are subject to cooling by techniques known and used in the construction of rocket engines.

Most transatmospheric vehicles and first stage air breathing launch vehicles have a flight path which is relatively steep through the atmosphere, in order to minimize atmospheric drag and heating. Therefore it is desirable to extend not only maximum Mach number of operation but the maximum altitude at which air breathing can be accomplished. Typically maximum altitude is limited by oxygen starvation in the combustor resulting in flameout. By adding additional oxygen from the inlet injection system, the invention can propel an aircraft to higher altitudes than might be possible if conventional engines only powered the aircraft. Since the atmosphere is less dense at higher altitudes, the aircraft experiences less drag while accelerating than it would at lower altitudes. This drag reduction during acceleration increases the overall performance of aircraft flying trans-atmospheric missions.

Several or all four functions: thrust augmentation, inlet matching, extended Mach number flight, and increased maximum altitude flight, can be optimized in conjunction with a particular vehicle concept and trajectory, selecting the oxygen injection rate to provide maximum vehicle performance.

As will be understood by the designer of high-performance aerospace vehicles, a new engine concept provides additional design flexibility, and ability to meet particular mission requirements. Thus, the amount of liquid oxidizer injection at each stage of a vehicle mission can be traded against other design parameters to yield an optimal injection strategy and engine vehicle integration approach. Thus it will be understood that the scope of this invention includes a wide range of possible oxygen injection levels during different flight regimes in order to accomplish particular design solutions.

To achieve optimal flexibility over the widest flight range, a variable throat 44 diameter is desirable or even necessary. Depending on gas temperatures, the throat diameter adjustments may be mechanical or accomplished with fluid dynamics means, such as a rotating gas vortex.

It should be understood that turbine power can be increased as necessary by increasing fuel added to the combustor section, within the maximum temperature limits of the power turbine. If further power is necessary, a greater pressure drop across the turbine could be allowed by increasing throat area to decrease afterburner chamber pressure.

It should be understood that a wide variety of fuels can be used with the engine 20, typically a high-density hydrocarbon such as JP7 might be used, although lighter hydrocarbons such as liquefied propane, liquefied methane, or hydrogen are possible. Moreover, it should be understood that oxidizers other than liquid oxygen might be used such as; liquid air, nitrous oxide ($N_2O$), nitrogen tetroxide ($N_2O_4$), or hydrogen peroxide ($H_2O_2$). For some flight profiles where maximum cooling is desired while minimizing the amount of fluid injected, hydrogen peroxide diluted with water may be optimal.

It is understood that the invention is not limited to the particular construction and arrangement of parts herein illustrated and described, but embraces all such modified forms thereof as come within the scope of the following claims.

I claim:

1. A method of thrust augmenting a jet turbine engine on an aerospace vehicle, comprising the steps of:

injecting liquid oxidizer into a duct upstream of an engine compressor section, and evaporating to injected liquid oxidizer, to create oxidizer vapor, in a stream of air containing oxygen flowing into the engine compressor section;

compressing the stream of air, and the oxidizer vapor in the engine compressor section;

burning a portion of the oxidizer vapor, and oxygen in the air with an oxidizable fuel, to create an oxidizer rich combustion stream within a combustion chamber downstream of the engine compressor section;

extracting energy from the oxidizer rich combustion stream with a power turbine downstream of the combustion chamber, and driving the compressor section with the output of the power turbine;

afterburning the oxidizer rich combustion stream with additional oxidizable fuel, to create an exhaust gas stream in an afterburner chamber downstream of the power turbine; and accelerating the exhaust gas stream through a nozzle to develop thrust, wherein sufficient liquid oxidizer is injected into the duct upstream of the engine compressor section to increase the unaugmented thrust of the engine by approximately five times when said injected sufficient liquid oxidizer is combusted with the oxidizable fuel and the additional oxidizable fuel.

2. The method of claim 1 wherein the liquid oxidizer is liquid oxygen.

3. The method of claim 1 wherein the liquid oxidizer is selected from the group consisting of nitrogen tetroxide, nitrous oxide, liquid air, hydrogen peroxide and a hydrogen peroxide water solution.

4. The method of claim 1 wherein the afterburning of the oxidizer rich combustion stream with additional oxidizable fuel is to approximate stoichiometric conditions.

5. The method of claim 1 wherein the step of injecting a selected quantity of liquid oxidizer is conducted through an injector mounted to inject oxidizer radially inwardly of the duct inlet inner surface.

* * * * *